US012762725B2

(12) United States Patent
Aydermir et al.

(10) Patent No.: US 12,762,725 B2
(45) Date of Patent: Oct. 13, 2026

(54) METHOD AND ELECTRONIC ARRANGEMENT FOR ITEM MATCHING

(71) Applicant: Volumental AB, Stockholm (SE)

(72) Inventors: Alper Aydermir, Solna (SE); Mikael Andersson, Stockholm (SE); Magnus Burénius, Åkersberga (SE); Rasmus Brönnegård, Sundbyberg (SE); Josef Grahn, Solna (SE); Miroslav Kobetski, Enebyberg (SE); Aleš Jurca, Täby (SE)

(73) Assignee: VOLUMENTAL AB, Stockholm (SE)

( * ) Notice: Subject to any disclaimer, the term of this patent is extended or adjusted under 35 U.S.C. 154(b) by 97 days.

(21) Appl. No.: 18/274,616

(22) PCT Filed: Feb. 4, 2022

(86) PCT No.: PCT/SE2022/050122
§ 371 (c)(1),
(2) Date: Jul. 27, 2023

(87) PCT Pub. No.: WO2022/169398
PCT Pub. Date: Aug. 11, 2022

(65) Prior Publication Data

US 2024/0169576 A1 May 23, 2024

(30) Foreign Application Priority Data

Feb. 5, 2021 (SE) .................................. 2150137-4

(51) Int. Cl.
*G06T 7/60* (2017.01)
*A43D 1/02* (2006.01)
(Continued)

(52) U.S. Cl.
CPC ................ *G06T 7/60* (2013.01); *A43D 1/025* (2013.01); *G06T 7/11* (2017.01); *G06T 17/00* (2013.01);
(Continued)

(58) Field of Classification Search
None
See application file for complete search history.

(56) References Cited

U.S. PATENT DOCUMENTS 8,908,928 B1 12/2014 Hansen
9,799,064 B2 * 10/2017 Ohnemus ........... G06Q 30/0631
(Continued)

FOREIGN PATENT DOCUMENTS

EP 3716192 A1 9/2020
GB 2488237 A 8/2012
(Continued)

OTHER PUBLICATIONS

PCT International Search Report and Written Opinion dated Mar. 4, 2022 for International Application No. PCT/SE2022/050122, 16 pages.
(Continued)

*Primary Examiner* — Saptarshi Mazumder
(74) *Attorney, Agent, or Firm* — Brian J. Colandreo; Heath M. Sargeant; Holland & Knight LLP

(57) ABSTRACT

The present disclosure generally relates to a computer implemented method for finding a best matching item for a user's body part by comparing a geometrical model of the user's body part with a plurality of statistical models for different items intended to interface with the body part. The present disclosure also relates to a corresponding electronic arrangement and a computer program product.

20 Claims, 3 Drawing Sheets

(51) Int. Cl.

| | |
|---|---|
| ***G06T 7/11*** | (2017.01) |
| ***G06T 17/00*** | (2006.01) |
| ***G06T 19/00*** | (2011.01) |

(52) U.S. Cl.

CPC .... *G06T 19/00* (2013.01); *G06T 2207/30196* (2013.01)

(56) References Cited

U.S. PATENT DOCUMENTS

| | | | |
|---|---|---|---|
| 10,282,914 | B1 | 5/2019 | Tran et al. |
| 10,339,597 | B1 | 7/2019 | Blossey et al. |
| 2016/0092956 | A1 | 3/2016 | Su et al. |
| 2017/0018024 | A1 | 1/2017 | Xu et al. |
| 2017/0039622 | A1* | 2/2017 | Chen .................. G06Q 30/0201 |
| 2017/0352092 | A1* | 12/2017 | Mitchell ............... G06T 15/503 |
| 2018/0091732 | A1* | 3/2018 | Wilson ................. H04N 23/611 |
| 2019/0174874 | A1 | 6/2019 | Lee et al. |
| 2020/0005386 | A1 | 1/2020 | Blossey et al. |
| 2021/0049811 | A1 | 2/2021 | Fedyukov et al. |
| 2021/0135892 | A1* | 5/2021 | Ghanaie-Sichanie ........................ H04L 12/1831 |

FOREIGN PATENT DOCUMENTS

| | | | |
|---|---|---|---|
| WO | 2014037939 | A1 | 3/2014 |
| WO | 2016061341 | A1 | 4/2016 |
| WO | 2016185400 | A2 | 11/2016 |
| WO | 2018154331 | A1 | 8/2018 |
| WO | 2021007592 | A1 | 1/2021 |

OTHER PUBLICATIONS

Swedish Search Report dated Sep. 21, 2021 for Swedish Patent Application No. 2150137-4, 3 pages.

Extended European Search Report dated Nov. 28, 2024 for EP Application No. 22750118.6, 10 pages.

* cited by examiner

METHOD AND ELECTRONIC ARRANGEMENT FOR ITEM MATCHING

CROSS-REFERENCE TO RELATED APPLICATIONS

This application is a 371 U.S. National Stage of International Application No. PCT/SE2022/050122, filed Feb. 4, 2022, which claims priority to Swedish Patent Application No. 2150137-4, filed Feb. 5, 2021. The disclosures of each of the above applications are incorporated herein by reference in their entirety.

TECHNICAL FIELD

The present disclosure generally relates to a computer implemented method for finding a best matching item for a user's body part by comparing a geometrical model of the user's body part with a plurality of statistical models for different items intended to interface with the body part. The present disclosure also relates to a corresponding electronic arrangement and a computer program product.

BACKGROUND

The selection of an item for interfacing with a consumer's body part, such as e.g. a shoe, etc., is greatly influenced by individual differences in size and preference for fitting comfort. When visiting a physical store, it is possible to get assistance from e.g. a clerk in determining a suitable size for the exemplary shoe. One of the most commonly used devices for measuring feet for fitting shoes is the Brannock device. This manual device includes two levers slidably mounted upon a labeled platform for determining the length and width of a particular foot.

The manual and imprecise nature of the Brannock device has led to efforts for improvement. Thus, apparatus and methods for analyzing feet using electronics and digital technology, such as pressure sensors, optical sensors, and other devices have been developed. An example of such an apparatus is the use of various three-dimensional (3D) scanning arrangements positioned in the physical store and operated to generate data used by human experts as part of the human experts' product recommendation process. There are also embodiments of 3D scanning systems that utilize various software systems to replace the human expert.

The trend is however moving away from physical stores towards general online shopping. One problem with online shopping is that the consumer does not have confidence in the item that is being purchased. More particularly and specifically for fashion merchandise, the consumer must order from available sizes of goods offered and cannot be assured that the goods will fit properly. Also, with respect to shoes, due to variations in shoe sizes offered by various manufacturers and a consumer's changing foot size, a consumer can never be certain that the ordered shoes will fit properly.

To increase the consumer confidence when making an online purchase, it has been suggested to scan the relevant body part at home using a mobile phone equipped with a camera, and to get a recommendation of a suitable item based on images captured and processed by e.g. the mobile phone. Recent advances in mobile computing technology in combination with better sensors have allowed for the possibility to take a step further and to reconstruct a volume of the relevant body part, such as a foot, to allow for a better determination of a fit with e.g. a shoe.

An example of such an implementation is presented in US20190174874, combining 3D scanning using a mobile phone with Artificial Intelligence (AI) applying an automated fitting algorithm for fitting and selection of athletic footwear. By means of the implementation as is suggested in US20190174874, the user scans each of his feet using a camera comprised with the mobile phone to determine exact length and width measurements of each foot. The suggested implementation also takes into account attributes, which are not measurable or intangible, using a form comprising a plurality of user related questions. By allowing the fitting algorithm to rely on both tangible and intangible attributes, it is possible to increase an overall user satisfaction with the selected footwear. However, even though the solution presented in US20190174874 has a positive impact on generally selecting fitting footwear, it heavily relies on the user input that by its nature is subjective, meaning that the fitting result will be somewhat unreliable.

Further attention is drawn to U.S. Pat. No. 8,908,928, presenting a method for generating a size measurement of a body part of person for fitting a garment, include providing photographic data that includes images of the body part and using feature extraction techniques to create a computer model of the body part. Also U.S. Pat. No. 8,908,928 focuses on measures for allowing a user to, in e.g. a home environment, identify garments that could be suitable and fitting. However, the solution in U.S. Pat. No. 8,908,928 relies heavily on high quality images data to be able to generate reliable size measurements. Obviously, such an approach is in clear contradiction with user operation in a home environment, where image capturing conditions may be greatly varying based on user operation. The method as presented in U.S. Pat. No. 8,908,928 may thus result in improper fitting between the body part and the garment.

Taking the above into account, there seems to be room for further improvements in relation to assisting a user in selecting the best matching item for a user body part, where the matching is executed with higher reliability and less subjectiveness as compared to prior-art.

SUMMARY

According to an aspect of the present disclosure, it is therefore provided a computer implemented method performed by an electronic arrangement, the electronic arrangement comprising a processing unit arranged in communication with a display screen and a data capturing arrangement, wherein the method comprises the steps of acquiring, using the data capturing arrangement, a first set of data representative of a scene of a surrounding of a user, determining, using the processing unit and based on the acquired first set of data, an area within the surrounding of the user fulfilling a predefined quality metric, acquiring, using the data capturing arrangement and following an indication that the user has moved to the area fulfilling the predefined quality metric, a second set of data, wherein the second set of data comprises data representative of a body part of the user, estimating, using the processing unit and based on the acquired second set of data, a geometric model of the user's body part, determining, using the processing unit, a matching measurement between the estimated geometrical model and each of a plurality of predefined statistical models each relating to different items for the body part, and displaying, using the display screen, a representation of at least one item for the body part having a matching measurement being above a predetermined matching threshold.

By means of the present disclosure it is made possible to in a better and swifter way ensure that an untrained user in a home environment can select the best fitting item that is to interface and/or interact with a specific body part of the user, while at the same time reduce the subjectiveness in the fitting process, thereby improving the overall user experience involved with selecting an item. This is in line with the present disclosure made possible by comparing an estimated geometric model of the user's body part with predefined statistical models each relating to different items for the body part. Such an item to interface and/or interact with a specific body part of the user may for example be a garment product, including footwear, gloves, shorts, jackets, pants, hats/caps, helmets, etc. The item could also include products from separate categories, such as a baseball bat, a hockey stick, a computer mouse, a bike, a chair, etc. Any other item to interact or interface with a body part should be understood to fall within the scope of the present disclosure. Correspondingly, the body part may for example be a foot, a hand, a head, a torso, an overall body shape, etc.

In some prior-art solutions it has been suggested to compare a user's body part volume with a product volume, for example an estimated three-dimensional (3D) volume of a user's foot and a 3D product volume of a shoe. However, such a prior-art scheme is inherently unreliable. First of all, it is all but simple to get the untrained user to acquire relevant data of the user's body part to be able to determine a reliable body part volume. For example, the general sensors used for acquiring the data in a home environment generally produce noisy signals, thus resulting in a lengthy user process to acquire enough data to form a somewhat reliable body part volume. Secondly, also the formation of the 3D product volume of the shoe is prone to errors, for example due to complex scanning processes and differences resulting from manufacturing, choice of materials, how the shoe is worn/laced, wear in etc. Scanning of all possible items to be matched to a body part would also be a tedious and expensive process, reducing the commercial value of an implementation relying on such information. A relevant factor is thus how the item is used, meaning that e.g. a shoe may be seen as "behaving" differently based on how the user wearing the shoe uses the shoe.

Accordingly, rather than relying on the necessity of forming a highly accurate body part volume and complex scanning of different items, the present disclosure allows for an accuracy relaxation in relation of the body part volume while also making use of a predefined statistical model of the item. The statistical model of the item inherently different to a 3D product volume as used according to prior-art implementation.

Rather, the statistical model is here defined based on e.g. other users that have selected to interact with the specific item, and possibly also further information about how this interaction has been made. Such further information may for example include details about how the other user has been using the item. An example of use of an item, where the item is a shoe, could relate to if the shoe is used for walking, running, climbing, etc. A short/long distance runner may for example possibly select a larger shoe as compared to a climber desiring a tighter fit. The statistical model will thus, in some sense, be seen as a combination of the (many) other users estimated geometric models for their respective body part, and possibly how the specific item/product is used by other users. Accordingly, while an estimate geometric model for a user's body part typically (at least in some stages of determination) can be seen as a 3D model of the user's body part, the statistical model should be seen more general, such as being represented as a collection of different statistical parameters, possibly relevant to different sections (or portions) of the model.

The statistical model for a specific item will generally be determined in a prior process (i.e. to the matching scheme according to the present disclosure), by e.g. analyzing other users' body parts and what type of items that were selected by the other users, such as when the other users each made a purchase of an item. A non-returned purchase may for example be seen as an indication that the item fitted another user's body part in a sufficiently well manner. That user's estimated geometric model of his/her body part may thus be included in the statistical model for the item. The plurality of users that have e.g. purchased the same type of item (such as the same type of shoe in the same size) will all have different estimated geometric models, due to the inherent difference in size between different persons. Combining (and possibly correlating) a plurality of users' different estimated geometric models thus results in a statistical distribution (in the simplest case a mean and a variance) for a "virtual body part" matching the item. The virtual body part may in turn be seen as the statistical model for the item. The purchase may for example in one embodiment be a purchase made in an online store.

The recommendation that is finally provided to the user is not just related to how well the body part is matching the item. Rather, the recommendation provided to the user will at least in some embodiments be based on how well (a plurality of) other users with a similar body item has perceived the item. If a (relatively) large plurality of similar (other) users have perceived the item as fitting, then it may be estimated that the item is statistically likely to also fit the present user. A statistical matching between is thus more likely to be a "good" matching as compared to just comparing a size of a single user's body part and a garment/item relating to the body part. In the end, ensuring a good match between the body part and the item will result in a more satisfied user and thus less risk of the user returning the item.

In some embodiments it may be desirable to adapt the statistical model to include information relating to a material or manufacturing property for the item. As an example, some materials may be more flexible as compared to other materials, resulting in a possibility for a greater "matching range" as compared to a non-flexible material. The expression manufacturing property could also in some embodiments relate to known limitations with the manufacturing of the item, such as known uncertainties with a size reliability resulting from a specific manufacturing process. As a result, it may be desirable to incorporate prior probability distributions into the statistical model, such as increasing its variance in case the manufacturing process is known to be unreliable.

In line with the present disclosure, the comparison is made between the estimation of the geometric model of the user's body part and the statistical model for the item. Since the statistical model will be formed, at least in part, from other users' estimated geometric models, the estimation of the geometric model of the user's body part must not be absolutely exact. Rather, also a somewhat "noisy" geometric model of the user's body can be compared to the statistical model since the inherent variance of the statistical model will handle such possible differences.

The concept according to the present disclosure may generally be implemented with many different sensor systems comprised with the data capturing arrangement for acquiring the data representative of a body part of the user. Examples of such sensor systems that may be comprised with the data capturing arrangement includes an image capturing device (e.g. a camera), a Lidar arrangement, a radar, a laser scanner, an inertial measurement unit, a structured light projector, a stereoscopic imaging arrangement, a heat sensor, etc. Other sensors systems, present and future, are of course possible and within the scope of the present disclosure. It may of course be possible to combine more than one sensor with the data capturing arrangement, such as for example an image capturing device and a Lidar arrangement.

To ensure that the (second set of) data relating to the user's body part is acquired in the best possible manner, it is in accordance to the present disclosure included a scheme for ensuring that the user is positioned suitably when acquiring the (second set of) data. This is in line with the present disclosure achieved by collecting (a first set of) data representative of a surrounding of a user, such as for example relating to a scene in the surrounding of the user. The data about the scene is then analyzed, for example by applying an image processing scheme in case the (first set of) data comprises image data, to determine if the area is fulfilling a predefined quality metric. Such a predefined quality metric may for example relate to a lighting condition (e.g. such as glares, high contrasts or lack of light), that the area in is essentially flat, etc. As an example, in case the area is considered to be too dimly lit and cluttered with obstacles, such an area would not be considered to fulfill the predefined quality metric.

Further examples that may affect the predefined quality metric may for example include floor textures or floor patterns (that can interfere with typical computer vision algorithms), nearby objects (that can occlude or interfere with the measurements), a surface feature (hard surface vs. a fluffy rug), etc.

Fulfillment of the predefined quality metric can thus in one embodiment be seen as a step of determining a quality level and then comparing this quality level with a quality threshold. If the quality level is below the quality threshold, then the predefined quality metric is not considered to be fulfilled.

The implementation according to the present disclosure may thus, for example using the display screen, inform the user that he/she is to move to an area being more suitable for acquiring the (second set of) data relating to the body part of the user. It may generally be desirable to segment the first set of data into a floor plane, the body part and non-related occluding objects, for example for determining the suitable area to be used when acquiring the data relating to the user's body part.

A further quality metric could relate to how the user is positioned at the scene. As such, in some embodiments it may for example be desirable that the user is standing straight at a flat surface, for example if data is to be acquired relating to a foot of the user. It may accordingly be desirable to "force" the user to adjust where the second set of data is to be acquired. In some embodiments it may thus be possible to make use of the display screen for directing the user to a desirable area where the second set of data is to be acquired. In line with the present disclosure, the data about the user's body part is only acquired when the quality metric is fulfilled. In line with the discussion above, if the user is determined to be positioned correctly within the scene, then a related quality level may be defined as above the mentioned quality threshold, and thus the predefined quality metric is fulfilled.

Once the predefined quality metric has been fulfilled, the scheme according to the present disclosure proceeds to acquire the (second set of) data relating to the user's body part to estimate the above discussed geometrical model of the user's body part, to be compared to the plurality of statistical models for different items. For example, the processing unit may generally be arranged to determine if the user has moved to the previously determined scene, where this scene has been determined to fulfill the predefined quality metric. The processing unit may then generate an indication of the status of the user, thereby allowing the scheme to proceed for acquiring the second set of data.

The comparison between the user's body part and the plurality of statistical models for different items will in accordance to the present disclosure result in a matching measurement. The expression matching measurement should however be interpreted in the broadest sense, meaning that many different types of matching measurements may be formed based on the comparison between the geometric and the statistical models.

Preferably, a parameterized version of the geometric model of the user's body part is used in determining the matching measurement with the statistical models, where also the statistical models in such an embodiment is provided in a parameterized version. The parameterized version could for example be represented as a Principal Component Analysis (PCA) model providing some form of dimensionality reduction, to form a reduced set of parameters (e.g. 50 instead of one million) to capture the "essence" of the shape of the body part.

Each of the models may thus be seen as represented by several real variables for each of a plurality of portions or components of the models. Furthermore, different "shapes" of the 3D geometric model may be represented by a shape descriptor for that specific portion of the model, providing e.g. a simplified representation of a shape of a portion of the geometric model.

In one implementation the matching measurement could for example be a single number (such as from 1-10) indicating how well the geometric model of the user's body part is estimated to match with each statistical model. Such a single number implementation could for example be determined by forming a normalized average difference between the geometric model and a mean value representation of an item's statistical model, with the further addition of penalizing cases where the geometric model is determined to be "outside" of the inherent variance range for the statistical model.

Another implementation of the matching measurement could for example be a multi-dimensional determination of how well the geometric model of the user's body part is estimated to match with each statistical model. In such an implementation the matching measurement could for example include one matching measurement for each different and relevant dimension of the body part/item, such as one matching measurement relating to length, one relating to width and one relating to height. Also, in such an embodiment it may be desirable to penalize situations where the geometric model falls outside of the inherent variance range for the statistical model.

In a possible embodiment it may further be desirable to ensure that the second set of data is filtered before estimating the geometric model of the user's body part. Such filtering may for example be relating to combining and averaging a plurality of portions of data relating to the same section of the body part. It may also be possible to make use of different sensors for acquiring the second set of data, where the correlation between the information provided by the different sensors may be used for noise reducing the second set of data.

It may furthermore be desirable to in some embodiments form a plurality of outlines of the body part of the user. Accordingly, in some embodiments the geometric model of the user's body part is represented as an outlined structure, as will be further illustrated in relation to the detailed description as is presented below.

The matching between the geometric model and the statistical models may in some embodiments comprise applying a machine learning based processing scheme. It should however be understood that other steps of the present scheme may fit well with machine learning based processing schemes. Thus, the application of such machine learning based processing schemes are not in any way limited to just the matching process.

It may generally be desirable to ensure that the machine learning based matching scheme has been "trained" in such a manner that the scheme swiftly recognizes different items and body parts. The machine learning based processing scheme could also be used for identifying occluding objects in relation to the body part, such as for example a skirt or pant legs, or even other body parts of the user. The training must however not necessarily be performed for each item type and size of item but may be performed in a general manner and in advance when developing the machine learning based processing scheme. It should further be understood that the machine learning based processing scheme additionally may be used by the processing unit for identifying a state of the body part (such as e.g. position on a flat surface, sitting down, standing up, outstretched body part, etc.). It should further be understood that the machine learning based processing scheme may be implemented using one or a combination of different machine learning algorithms, also including neural networks in deep learning, also including artificial neural networks (ANN), such as but not limited to convolutional neural networks (CNN), feed-forward neural networks (FNN), etc. Throughout the collection of the first and the second set of data it may be desirable to provide the user with instructions to adjust how the data is acquired. In the simplest implementation, the display screen may present written instructions as to how to change a user's behavior to be able to acquire data of "higher quality". However, it may also be possible to generate a more complex and multimodal feedback using e.g. one or a combination of an image or audio generating device. For example, spoken feedback may be provided in combination with an image or video clip illustration of what went (possibly) wrong and how the user should proceed to ensure that the data is acquired in the best possible way.

In a preferred embodiment of the present disclosure, it may be possible to further include providing the feedback by means of augmenting an image stream collected using the data capturing arrangement and displayed at the display screen. Any form of augmented reality (AR) scheme could in accordance to the present disclosure be used for providing feedback to the user. Such AR feedback could possibly also be provided in real time as the user is acquiring the first and/or the second set of data. The type of feedback provided to the user may in some embodiments be dependent on a quality level of the data acquired using the data capturing arrangement. For example, in case low quality data is acquired by the user, more basic feedback is provided to the user.

According to another aspect of the present disclosure, there is provided an electronic arrangement comprising a processing unit arranged in communication with a display screen and a data capturing arrangement, wherein the processing unit is adapted to acquire, using the data capturing arrangement, a first set of data representative of a surrounding of a user, determine, based on the acquired first set of data, an area within the surrounding of the user fulfilling a predefined quality metric, acquire, using the data capturing arrangement and following an indication that the user has moved to the area fulfilling the predefined quality metric, a second set of data, wherein the second set of data comprises data representative of a body part of the user, estimate, based on the acquired second set of data, a geometric model of the user's body part, determine a matching measurement between the estimated geometrical model and each of a plurality of predefined statistical models each relating to different items for the body part, and display, at the display screen, a representation of at least one item for the body part having a matching measurement being above a predetermined matching threshold. This aspect of the present disclosure provides similar advantages as discussed above in relation to the previous aspects of the present disclosure.

In some implementations of the present disclosure the electronic arrangement is provided as a standalone implementation arranged to handle all aspects needed for providing the user with representation of at least one item for the body part having a matching measurement being above a predetermined matching threshold, i.e. the complete matching scheme as defined above.

However, it may in some other embodiments be desirable to arrange the processing unit to comprise at least a first and a second processing element, wherein the first processing element is arranged remotely from the second processing element. The first processing element may for example be comprised with the electronic arrangement. The first processing element must in such an embodiment not necessarily comprise enough processing power to handle all aspects of the matching scheme as defined above. Rather, some portions of the scheme may be executed remotely, using the second processing element.

In one possible embodiment, the electronic arrangement may be defined as a mobile electronic user device, for example a mobile phone or a tablet, comprising the first processing element, the display screen, and the data capturing arrangement. The second processing element may in such an implementation be comprised with a server, where the server is arranged in communication with the mobile electronic user device using a network connection, e.g. the Internet. The present disclosure may also be implemented in a way where a form of "pre-processing" of the first and second set of data is performed at the first processing element, and then "continued" at the second processing element. An output from the first processing element may possibly generate a "low quality" result, then enhanced when further processed at the second processing element.

According to a further aspect of the present disclosure, there is provided a computer program product comprising a computer readable medium having stored thereon computer program means for operating an electronic arrangement, the electronic arrangement comprising a processing unit arranged in communication with a display screen and a data capturing arrangement, wherein the computer program product comprises code for acquiring, using the data capturing arrangement, a first set of data representative of a surrounding of a user, code for determining, using the processing unit and based on the acquired first set of data, an area within the surrounding of the user fulfilling a predefined quality metric, code for acquiring, using the data capturing arrangement and following an indication that the user has moved to the area fulfilling the predefined quality metric, a second set of data, wherein the second set of data comprises data representative of a body part of the user, code for estimating, using the processing unit and based on the acquired second set of data, a geometric model of the user's body part, code for determining, using the processing unit, a matching measurement between the estimated geometrical model and each of a plurality of predefined statistical models each relating to different items for the body part, and code for displaying, using the display screen, a representation of at least one item for the body part having a matching measurement being above a predetermined matching threshold. Also this aspect of the present disclosure provides similar advantages as discussed above in relation to the previous aspects of the present disclosure.

A software executed by the processing unit for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, a solid state drive, other non-volatile flash based storage mediums, or a similar computer readable medium known in the art.

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
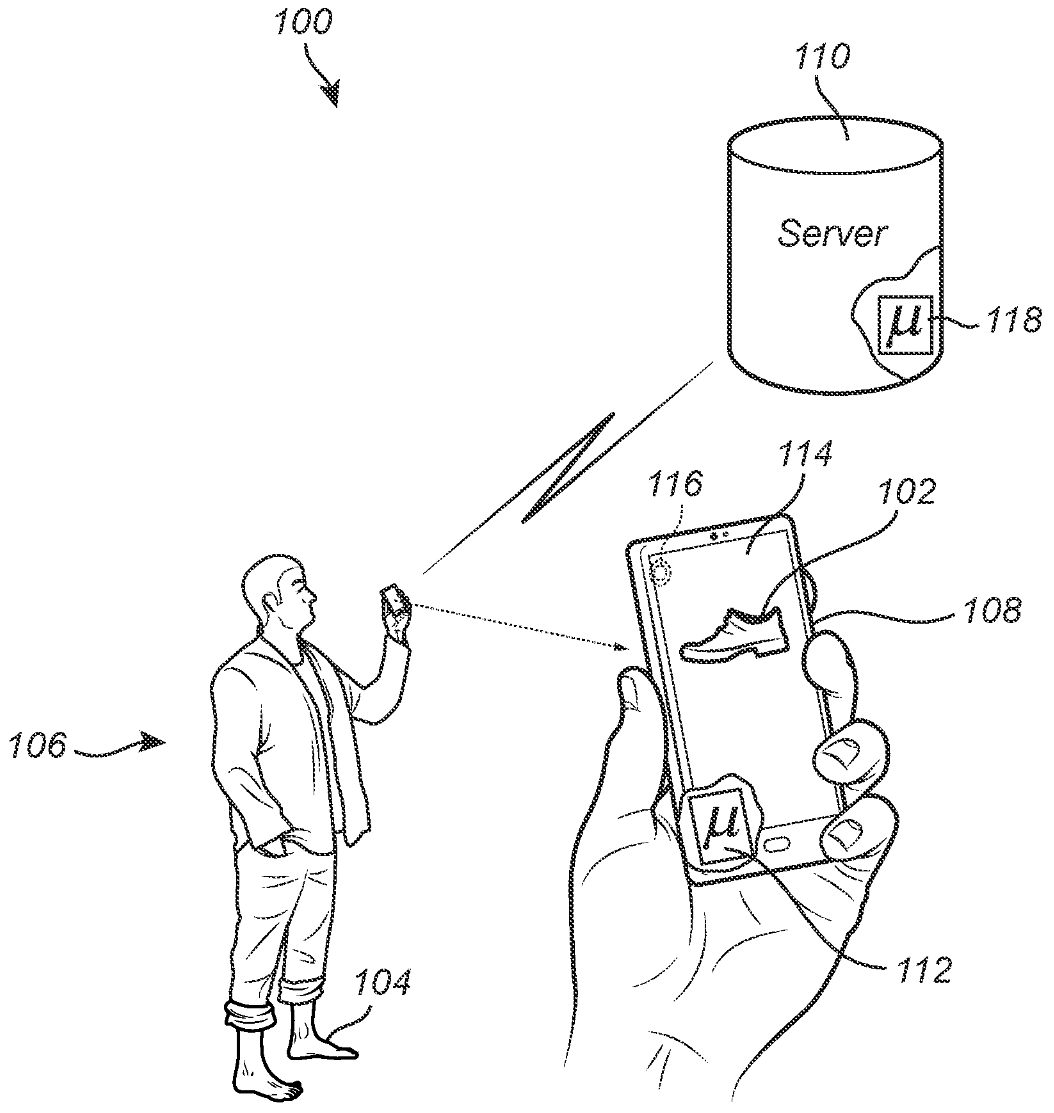
FIG. 1 schematically illustrates an electronic arrangement according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout. The following examples illustrate the present disclosure and are not intended to limit the same.

Turning now to the drawings and to FIG. 1 in particular, there is conceptually illustrated an electronic arrangement 100 adapted to match an item 102 to interface with a body part 104 of a user 106. In the example illustrated in FIG. 1, the item 102 is shown as a shoe and the body part 104 is a foot. It may however, as discussed above, be possible make use of the scheme according to the present disclosure to match different items or products (such as e.g. a baseball bat, a hockey stick, a computer mouse, a bike, a chair, glasses, gloves etc.) to any type of body parts (such as e.g. a hand, a head, a torso, an overall body shape, etc.).

The electronic arrangement 100 is in FIG. 1 illustrated as a "client-server" implementation comprising a mobile phone 108 operated by the user 106 and a server 110 arranged remotely from the user 106 (not even necessarily within the same country as the user 106). As indicated above, other types of user devices could be possible and fall within the scope of the present disclosure. Such user devices may for example include any device that provides visual feedback to the user while it captures sensor data of the body volume and scene, such as including AR-glasses, VR-headsets, portable computers with screen and sensors etc.

The server 110 could be a dedicated physical server or a so-called cloud server. The server 110 and the mobile phone 108 are preferably connected with each other using a network connection, such as provided by means of an Internet connection. Any form of wired or wireless network protocol is possible and within the scope of the present disclosure. It should be understood that other types of remote processing implementations are possible, for example including a so-called "serverless setup".

The mobile phone 108 comprises a first processing element 112, a display screen 114 and a data capturing arrangement 116. The data capturing arrangement 116 may in turn comprise one or a plurality of sensors for collecting information relating to the user 106 and to a surrounding of the user 106. Such sensors may for example include an image sensor (i.e. a camera), a Lidar arrangement, a radar arrangement, a laser scanner, inertial measurement unit, structured light projector, stereoscopic imaging arrangement or a heat sensor, etc. Further sensors are of course possible and within the scope of the present disclosure.

The server 110 in turn comprises a second processing element 118, where the first 112 and the second 118 processing element in combination provides an overall processing functionality, generally referred to as a processing unit. This is specifically relevant as it should be understood that the electronic arrangement in some alternative embodiments may be provided as a single unit implementation, where for example all of the processing functionality could be provided by a single processing unit.

For reference, the processing unit (and/or processing functionality) may for example be manifested as a general-purpose processor, a graphics processing unit, an application specific processor, a circuit containing processing components, a group of distributed processing components, a group of distributed computers configured for processing, a field programmable gate array (FPGA), etc. The processor may be or include any number of hardware components for conducting data, signal and/or image processing or for executing computer code stored in memory. It may also be possible and within the scope to make use of system-on-chip (SOC) implementations. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 2A:
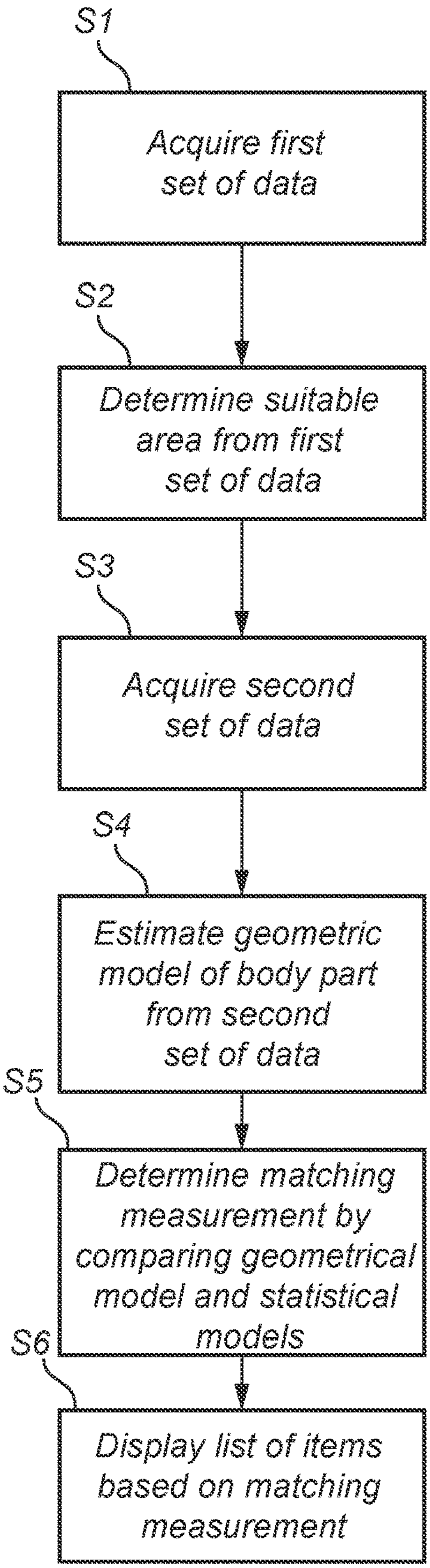
FIGS. 2A and 2B presents an exemplary flow of the steps of performing the method according to a currently preferred embodiment of the present disclosure, and FIG. 3 conceptually illustrates a model matching scheme used in conjunction with the present disclosure.
Figure 2B:
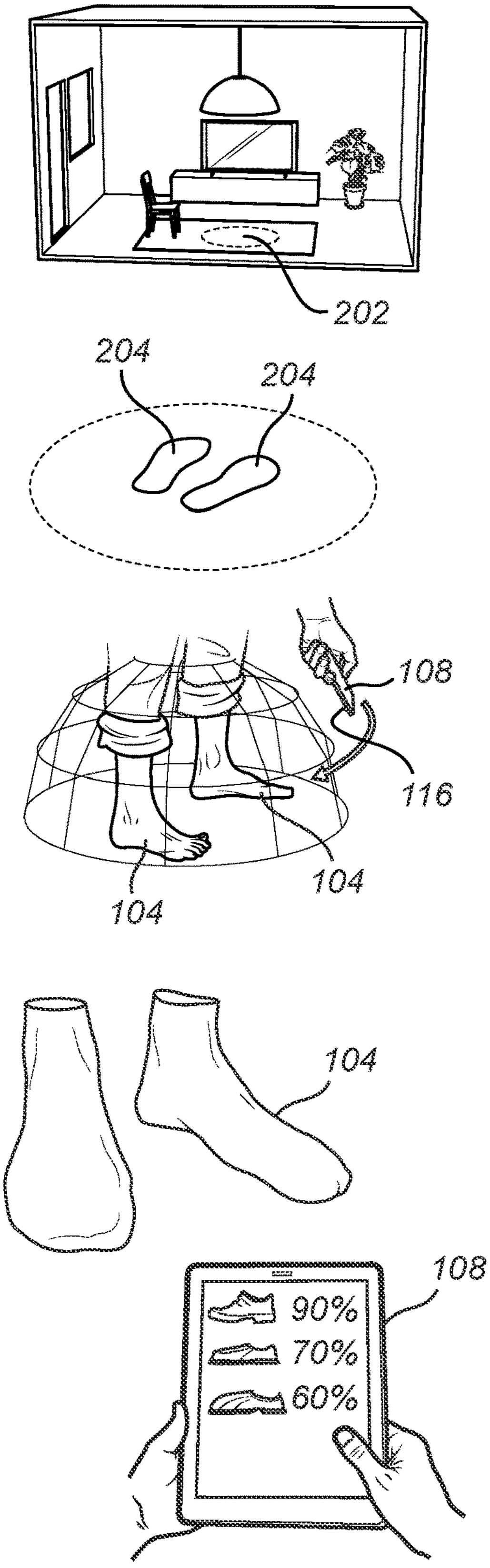

During operation of the electronic arrangement 100, with further reference to FIGS. 2A and 2B, the process may for example start by the user 106 operating an application being executed at the mobile phone 108. The application may for example be related to an online store providing different items.

When initiating the application, for example the camera 116 of the mobile phone 108, possibly in combination with e.g. a Lidar arrangement, will start acquiring, S1, a first set of data that is representative of a scene of a surrounding of the user 106. Based on the acquired first set of data it is possible to determine, S2, an area 202 within the surrounding of the user that is fulfilling a predefined quality metric, such as for example by investigating if there is a suitable flat surface where a following body part scanning could be performed, if the area is sufficiently lit, etc. This determination could for example be performed by the first processing element 112 implementing an image processing scheme, possibly combining the data from the camera 116 and the Lidar arrangement.

Once a suitable area has been identified, it may in accordance to the present disclosure be possible to instruct the user 106 to move to that specific area 202. Such instructions could be provided using the display screen 114, such as by providing real time movement instructions to the user 116. In some embodiments the movement instructions could be provided by implementing an augmenting reality (AR) functionality, in combination with image data displayed at the display screen 114. As shown in FIG. 2B, such AR instructions could be provided by outlining a portion 204 of the area where the user 106 is to move. It may in some embodiments be advantageous to configure the movement instructions in such a manner that the user 106 applies a desirable pose. As an example, in case the feet of the user 116 is to be (subsequently) scanned, it has shown to be desirable to instruct the user to arrange himself in a standing position.

When it has been indicated (such as by continuously analyzing image data from the camera 116) that the user 106 has moved to the specific area, the scheme according to the present disclosure proceeds to acquiring, S3, a second set of data, where the second set of data comprises data representative of a body part of the user 106. In this case the feet of the user 116. Also when acquiring the second set of data it may be suitable to instruct the user 106 as to how to acquire the data, again possibly using AR functionality provided in conjunction with the display screen 114. Here it is again possible to continuously analyze the acquired data to see if the user 106 is following the provided instructions or needs to be (in real time) instructed to change his scanning pattern. It is generally desirable to ensure that the user 116 is scanning the body part from at least two, but preferably three sides and possibly more sides of the body part.

When it has been determined that a sufficient amount of data has been acquired about the body part it is possible to estimate, S4, a geometric model of the user's 106 body part 104. The estimation of the geometric model may for example be performed by combining (and possibly stitching together using an image processing scheme) a large number of images acquired using the camera 116. It is also possible to combine the image data with depth data provided using e.g. the Lidar arrangement (if such sensor functionality is available at the mobile phone) 108. The final geometric model of the user's 106 body part 104 may further be handled by a process for forming a three-dimensional (3D) outline of the body part 104, where the outlined body part 104 is parameterized for further processing.

Figure 3:
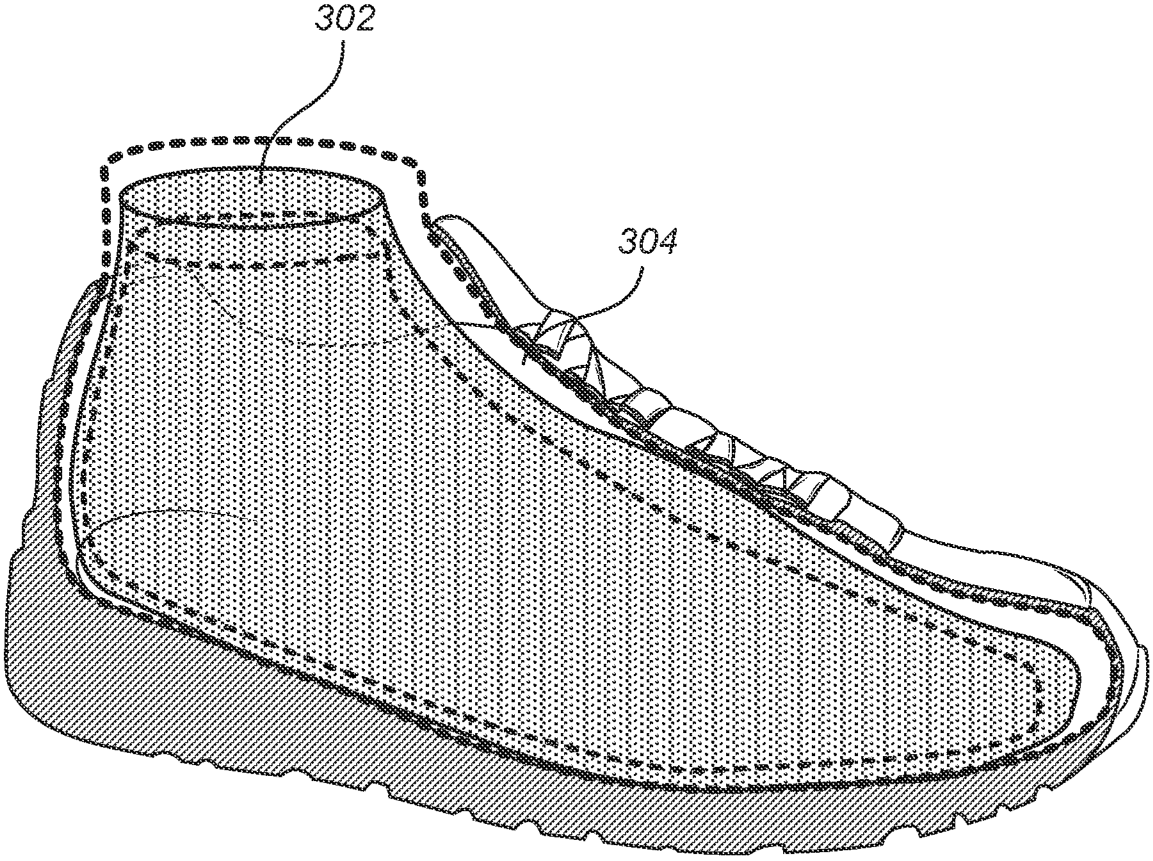

The parameterized geometric model of the body part 104 is then compared to each of a plurality of predefined statistical models each relating to different items 102 for the body part 104, in the example provided in FIG. 2B the item is a shoe. As discussed above, a statistical model for an item 102 is not the same as a scanned volume of the item 102. Rather, the statistical model for an item 102 is a combination/correlation of other users' geometrical models for their corresponding body parts. Accordingly, the statistical model for a specific item 102 (such as a specific type of shoe in a specific size) is formed from other users that for example have scanned their feet and then proceeded to purchase that specific shoe in the specific size. The inherent differences between the other user's different body part sizes (length, width, height, etc.) will together provide a probability distribution (in the simplest case a mean and a variance) for the statistical model for the specific item 102. FIG. 3 provides a conceptual and exemplary illustration of an outlined geometrical model 302 of the foot 104 of a user 106 arranged "within" a statistical model 304 of a shoe 102. The variance for the shoe 102 could be seen as a range for which a foot 104 is likely to be perceived by the user 106 as being a likely fit. The statistical model 304 for a specific item 102 may as such be dynamically "built" once users have formed geometrical models and then purchased a specific item 102. The more users that purchase the same item 102, the more relevant statistical model for that item 102.

The comparison between the geometric model 302 of the body part 104 and the statistical model 304 of the item 102 is used for determining, S5, a matching measurement. It is preferred to arrange the matching measurement to penalize a situation where the geometric model 302 of the body part 104 "falls outside" the statistical model 304 for the item 102. As an example and in relation to a shoe, even in case a length of the foot is considered to be within the variance for the statistical model 304 of the shoe 102, the matching measurement will be heavily penalized in case the width of the foot is considered to be outside of the width for the statistical model 304 of the shoe 102. The matching measurement will in this case be indicated as "no fit", "bad fit" or a low fit number (e.g. between 1-10).

Once the matching measurements have been determined for the plurality of statistical models, the process proceeds to display, S6, a representation of at least one item 102 for the body part having a matching measurement being above a predetermined matching threshold, such as within a graphical user interface (GUI) provided at the display screen 114 of the mobile phone 108. Accordingly, the predetermined matching threshold is provided to filter out items having a matching measurement that is considered to be "too low", ensuring that the user will be presented the matching items that the user is likely to be satisfied with.

In one embodiment, it could be possible to allow the predetermined matching threshold to be dependent on collected data relating to purchase and return transactions, specifically since returns may be taken an indication that something is to be considered as outside/below the threshold, and lack of returns is an indication that it is within/above the threshold.

Furthermore, it could be possible to display a list or other form of personal recommendation of items 102 at the display screen 114, having a matching measurement for shoes 102 that indicates at least e.g. a 50% match with the geometric model of the user's 106 feet 104. The list could in some embodiments be correlated with stock inventory, such that only shoes 102 in stock and having a matching of at least 50% is shown to the user 106. It should be understood that 50% match is only an example and can be selected arbitrarily, possibly by the user 106.

Within the scope of the present disclosure, it is also possible to present a more complete matching between the feet and the shoe, typically based on the matching measurement. For example, it could be possible to display a detailed matching information that indicates where the foot is expected to be best matching, as compared to least matching. As an example, a shoe may be an in comparison good match in relation to length and an in comparison less good match in relation to a width. The user may then take such information into account when determining if to proceed with purchasing a recommended shoe.

Still further, it could be possible to take some additional information about the user into account, such as for example if the user "knows" that he/she normally uses a specific shoe, glove, hat, jacket, etc., size. The matching process according to the present disclosure may as such take this prior knowledge into account to reduce the processing needed to find the best matching items 102 for the user 102 as well as possibly getting a better accuracy in the recommendation. Further prior information provided by and/or received about the user 102 may include item brand that the user 102 has previously purchased.

Furthermore, the control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, solid state drives or other non-volatile flash based storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method performed by an electronic arrangement, the electronic arrangement comprising a processing unit arranged in communication with a display screen and a data capturing arrangement, wherein the method comprises the steps of:

acquiring, using the data capturing arrangement, a first set of data representative of a surrounding of a user, determining, using the processing unit and based on the acquired first set of data, an area within the surrounding of the user fulfilling a predefined quality metric, wherein the predefined quality metric relates to lighting condition at the area and that the area is flat for purpose of a following body part scanning, acquiring, using the data capturing arrangement and following an indication that the user has moved to the area fulfilling the predefined quality metric, a second set of data, wherein the second set of data comprises data representative of a body part of the user, estimating, using the processing unit and based on the acquired second set of data, a geometric model of the user's body part, determining, using the processing unit, a matching measurement between the estimated geometrical model and each of a plurality of predefined statistical models each relating to different garment products for interfacing and/or interacting with the body part, wherein each predefined statistical model includes a probability distribution for a corresponding one of the different garment products, the probability distribution being determined by correlating a plurality of geometric models associated with body parts of a plurality of respective users that selected the corresponding garment product, wherein the probability distribution represents differences among the body parts represented by the plurality of geometric models, and displaying, using the display screen, a representation of at least one garment product for the body part having a matching measurement being above a predetermined matching threshold.

2. The method according to claim 1, further comprising at least one of the steps of:

noise-filtering, using the processing unit, the second set of data, or forming, using the processing unit, a plurality of outlines of the body part of the user.

3. The method according to claim 1, further comprising the step of:

parameterizing, using the processing unit, the model of the body part of the user.

4. The method according to claim 1, wherein the predefined statistical model for one of the plurality of garment products is associated with a material or manufacturing property for the garment product.

5. The method according to claim 1, wherein the step of determining the matching measurement comprises applying a machine learning based processing scheme.

6. The method according to claim 1, wherein the predefined quality metric is determined by:

identifying at least one of a plurality of predefined object types within the surrounding of the user.

7. The method according to claim 1, further comprising the step of:

segmenting the first set of data into a floor plane, the body part and non-related occluding objects.

8. The method according to claim 1, further comprising the step of:

providing, using the processing unit and the display screen, realtime movement information to the user to move to the area fulfilling the predefined quality metric.

9. The method according to claim 1, further comprising the step of:

providing, using the processing unit and the display screen, realtime instruction information to the user to acquire the second set of data according to a predefined capturing scheme.

10. The method according to claim 1, further comprising the steps of:

analyzing, using the processing unit, the second set of data to determine an indication of a quality level of the second set of data, and forming, using the processing unit and if the quality level is below a predefined threshold, a graphical illustration based on the indication of the quality of the second set of data, wherein the graphical illustration is presented at the display screen to influence the user in further acquisition of the second set of data.

11. An electronic arrangement comprising a processing unit arranged in communication with a display screen and a data capturing arrangement, wherein the processing unit is adapted to:

acquire, using the data capturing arrangement, a first set of data representative of a surrounding of a user, determine, based on the acquired first set of data, an area within the surrounding of the user fulfilling a predefined quality metric, wherein the predefined quality metric relates to lighting condition at the area and that the area is flat for purpose of a following body part scanning, acquire, using the data capturing arrangement and following an indication that the user has moved to the area fulfilling the predefined quality metric, a second set of data, wherein the second set of data comprises data representative of a body part of the user, estimate, based on the acquired second set of data, a geometric model of the user's body part, determine a matching measurement between the estimated geometrical model and each of a plurality of predefined statistical models each relating to different garment products for interfacing and/or interacting with the body part, wherein each predefined statistical model includes a probability distribution for a corresponding one of the different garment products, the probability distribution being determined by correlating a plurality of geometric models associated with body parts of a plurality of respective users that selected the corresponding garment product, wherein the probability distribution represents differences among the body parts represented by the plurality of geometric models, and display, at the display screen, a representation of at least one garment product for the body part having a matching measurement being above a predetermined matching threshold.

12. The electronic arrangement according to claim 11, wherein the processing unit is further adapted to:

noise-filter the second set of data, or form a plurality of outlines of the body part of the user.

13. The electronic arrangement according to claim 11, wherein the processing unit is further adapted to:

parameterize the model of the body part of the user.

14. The electronic arrangement according to claim 11, wherein the processing unit is further adapted to determine the predefined quality metric by:

identify at least one of a plurality of predefined object types within the surrounding of the user.

15. The electronic arrangement according to claim 11, wherein the processing unit is further adapted to:

analyze the second set of data to determining an indication of a quality level of the second set of data, and form a graphical illustrating based on the indication of the quality of the second set of data if the quality level is below a predefined threshold, wherein graphical illustrating is presented at the display screen to influence the user in further acquisition of the second set of data.

16. The electronic arrangement according to claim 11, wherein the processing unit comprises at least a first and a second processing element, wherein the first processing element is arranged remotely from the second processing element.

17. The electronic arrangement according to claim 16, wherein the first processing element, the display screen and the data capturing arrangement are comprised with a mobile electronic user device.

18. The electronic arrangement according to claim 16, wherein the second processing element is comprised with a server.

19. The electronic arrangement according to claim 11, wherein the data capturing arrangement comprises at least one of an image sensor, a Lidar arrangement, a radar arrangement, a laser scanner, inertial measurement unit, structured light projector, stereoscopic imaging arrangement or a heat sensor.

20. A computer program product comprising a non-transitory computer readable medium having stored thereon computer program means for operating an electronic arrangement, the electronic arrangement comprising a processing unit arranged in communication with a display screen and a data capturing arrangement, wherein the computer program product comprises:

code for acquiring, using the data capturing arrangement, a first set of data representative of a surrounding of a user, code for determining, using the processing unit and based on the acquired first set of data, an area within the surrounding of the user fulfilling a predefined quality metric, wherein the predefined quality metric relates to lighting condition at the area and that the area is flat for purpose of a following body part scanning, code for acquiring, using the data capturing arrangement and following an indication that the user has moved to the area fulfilling the predefined quality metric, a second set of data, wherein the second set of data comprises data representative of a body part of the user, code for estimating, using the processing unit and based on the acquired second set of data, a geometric model of the user's body part, code for determining, using the processing unit, a matching measurement between the estimated geometrical model and each of a plurality of predefined statistical models each relating to different garment products for interfacing and/or interacting with the body part, wherein each predefined statistical model includes a probability distribution for a corresponding one of the different garment products, the probability distribution being determined by correlating a plurality of geometric models associated with body parts of a plurality of respective users that selected the corresponding garment product, wherein the probability distribution represents differences among the body parts represented by the plurality of geometric models, and code for displaying, using the display screen, a representation of at least one garment product for the body part having a matching measurement being above a predetermined matching threshold.

* * * * *